United States Patent [19]

Calderon

[11] Patent Number: 4,494,984
[45] Date of Patent: Jan. 22, 1985

[54] METHOD FOR DIRECT REDUCTION OF IRON OXIDE UTILIZING INDUCTION HEATING

[76] Inventor: Albert Calderon, 1065 Melrose St., Bowling Green, Ohio 43402

[21] Appl. No.: 166,172

[22] Filed: Jul. 7, 1980

Related U.S. Application Data

[63] Continuation-in-part of Ser. No. 131,137, Mar. 17, 1980.

[51] Int. Cl.$^3$ ............................................. C21B 13/12
[52] U.S. Cl. ............................................. 75/11; 75/37
[58] Field of Search ................. 75/11, 37, 36; 13/26, 13/27; 202/114, 99, 108, 120, 223, 228, 227; 373/151

[56] References Cited

U.S. PATENT DOCUMENTS

| | | | |
|---|---|---|---|
| 1,097,513 | 5/1914 | Benner | 48/202 |
| 1,524,784 | 2/1925 | Bartolomeis et al. | 48/202 |
| 1,713,189 | 5/1929 | Marshall | 48/202 |
| 1,759,173 | 5/1930 | Smith | 75/37 |
| 1,785,428 | 12/1930 | Smith | 75/37 |
| 2,094,946 | 10/1937 | Hubann | 48/202 |
| 2,509,921 | 5/1950 | Gwynn | 373/151 |
| 2,683,657 | 7/1954 | Garbo | 48/202 |
| 2,704,662 | 3/1955 | Kocks | 75/11 |
| 2,786,747 | 3/1957 | Gallusser | 75/11 |
| 3,377,266 | 4/1968 | Salnikov | 208/11 |
| 3,948,640 | 4/1976 | Elvander et al. | 75/11 |
| 4,242,125 | 12/1980 | Colautti | 75/37 |

*Primary Examiner*—M. J. Andrews

[57] ABSTRACT

A method of reducing iron oxide by induction heating. The method involves the following steps:
(a) charging iron oxide and a carbonaceous material into the inlet end of a plurality of compartments whose walls comprise a material which is adaptable to being heated by induction wherein the plurality of compartments commonly share an induction coil means which surrounds the plurality of compartments and the induction coil means does not individually surround any of the compartments;
(b) heating the walls of the compartments by the induction coil means to cause the metallization of the iron oxide by the reducing agents contained in the carbonaceous material;
(c) discharging metallized iron from an outlet end of the plurality of compartments;
(d) forcing the gaseous products generated by the reaction of the iron oxide and the reducing agents of the carbonaceous material, to flow toward the outlet end of the compartments to increase the efficiency of metallization; and
(e) collecting the gaseous products resulting from the metallization of the iron oxide.

15 Claims, 1 Drawing Figure

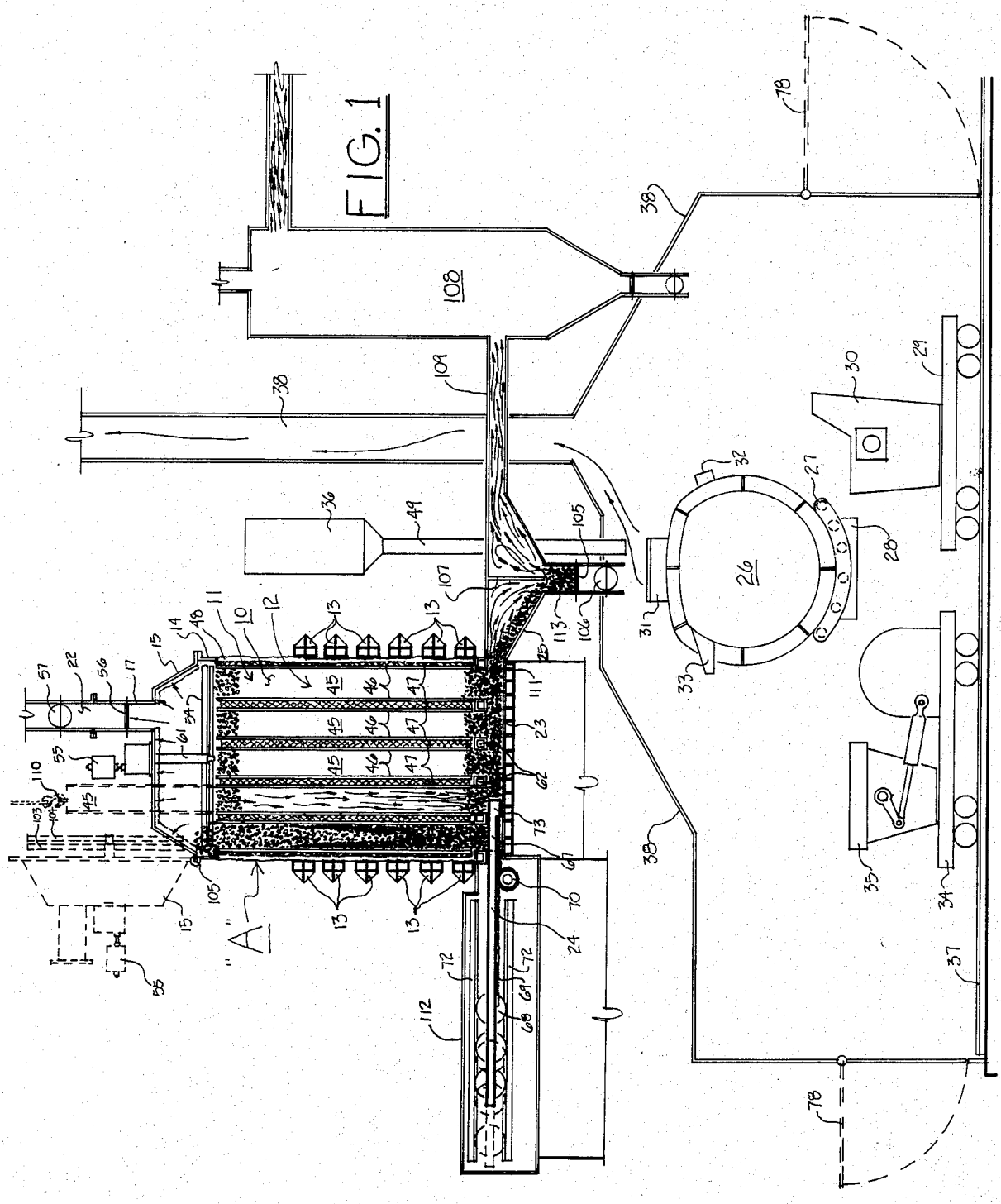

METHOD FOR DIRECT REDUCTION OF IRON OXIDE UTILIZING INDUCTION HEATING

This application is a continuation-in-part of Ser. No. 131,137 filed Mar. 17, 1980.

The present invention relates to an improved method and apparatus for the direct reduction of iron oxide. This invention is an improvement over the invention disclosed in U.S. Pat. No. 2,729,556 issued to Fontana on Jan. 3, 1956. More specifically, this invention is a continuation-in-part of the applicant's co-pending patent application having Ser. No. 06/131,137 which was filed on March 17, 1980, and which discloses a method and apparatus for the making of iron by directly reducing the iron ore with a carbonaceous material such as coal by providing a retort made up of a shaft which contains a plurality of compartments whose walls are made of iron or steel and are heated by induction. A patent application was filed on May 27, 1980 subsequent to the application having Ser. No. 06/131,137, disclosing the applicant's improved method and apparatus to gasify coal using the same principle of induction heating. Application Ser. No. 153,159 has been abandoned in favor of a continuation application (Ser. No. 365,899) which was filed on Apr. 6, 1982. This application of May 27, 1980 also discloses an alternate arrangement for the removal of the gases, which arrangement is for the removal of the gases not from the top of the system and for the operation of the system under pressure.

The disclosure of Fontana is an inclined rotating tube or container similar to a kiln formed of a substance which is a conductor of electricity but which has a melting point appreciably higher than that of iron and which tube or container can be heated by induction. As far as the applicant is aware, other than in the co-pending applications of the applicant pertaining to this subject matter, no one has heretofore disclosed a vertical retort made up of a plurality of compartments, each compartment of which possesses walls which are insulated and isolated from the walls of an adjacent compartment with the walls of each compartment being individually heated by induction to form a cluster of hot islands, and at the same time having the gas generated from volatilization forced downwardly by internal pressure.

Therefore the main object of the instant invention is to provide an improvement to the method and apparatus for the direct reduction of iron ore in a vertical retort using coal as a base disclosed in said co-pending application of the applicant wherein the efficiency of said method and apparatus is greatly increased by pressurizing the gases generated from the volatilization of the coal and from the oxidation of the fixed carbon in the coal to force said gases to be directed downwardly and thereby increase surface contact between said gases and said iron ore, Another object of the instant invention is to subject the gases resulting from the volatilization of the coal to the iron ore and coal mix in order to react the $H_2$ and CO contained in the volatilized gases with $O_2$ in the ore and thereby enhance the reducing reaction.

Still another object of the instant invention is to remove the gases after reduction from the bottom of said retort, Therefore still another object of the instant invention is to remove the gases after reduction from the top of said retort after directing them downwardly first and then re-directing them upwardly.

Yet another object of the instant invention is to reduce the electrical power consumption of the induction heating system by virtue of certain reduction taking place by the reaction of the $H_2$ and CO in the volatilized gases in addition to the reducing reaction taking place from the oxidation of the fixed carbon contained in the coal charged.

Further, another object of this invention is to further enhance the reaction to reduce the iron ore to metallic iron by subjecting the methane contained in the volatilized gases to a temperature above the cracking temperature of methane within each of said compartments in order to break up the methane into C and $H_2$ and subject the $H_2$ to the iron ore to further enhance the reducing reaction.

Further yet another object of the instant invention is to subject the tars, phenols and oils contained in the coal to a temperature exceeding 300° F. which temperature prevails in the heating zone of each of said compartments in order to incinerate them and thus destroy them.

It is another object of the instant invention to shift the sulfur contained in the gases of volatilization to the metallized iron during reduction to result in purified gases.

It is therefore another object of the present invention to subject the gases leaving said retort to a dust-collection clean-up to remove particulates from the gases.

It is yet another object of the present invention to subject the gases leaving said retort to a desulfurizing agent while said gases are still hot in order to obtain gases that are more purified.

It is still another object of the instant invention to provide a method and apparatus that is dependable and easy to maintain.

Still further another object of the instant invention is to provide an improved method and apparatus wherein the temperature is maintained below the clinkering temperature phase to avoid sticking of the charge within said compartments.

It is still further an object of the instant invention to reduce the amount of coal needed for reduction in order to save energy.

Further still another object of the instant invention is to provide a method and apparatus capable of using a variety of grades of ore and a variety of carbonaceous materials.

Yet still another object of the instant invention is to provide an improved method and apparatus wherein the downward pressure within each of said compartments is maintained to prevent bridging of the material charged within each of said compartments.

It is further yet another object of the instant invention to provide an improved method and apparatus for the reduction of iron ore to metallized iron capable of operating dependably day-in and day-out and at a lower cost then conventional facilities.

It is further still another object of the instant invention to provide an improved method and apparatus for the direct reduction of iron ore to metallized iron which requires a smaller capital investment than capital required for conventional facilities.

Other objects of this invention will appear from the following detailed description and appended claims, reference being made to the accompanying drawing forming a part of this specification wherein like reference characters designate corresponding parts in said co-pending application of which the instant invention is a continuation-in-part thereof.

BRIEF DESCRIPTION OF DRAWING

FIG. 1 is an elevational view taken through the system. It shows the retort in section and the balance in outline, also it shows the crown of the retort in the operating position in solid lines and in the maintenance position in dotted lines. In addition, FIG. 1 also shows the retort operating under pressure with the gases being forced downwardly with the removal of the gases from the bottom.

Before explaining in detail the present invention, it is to be understood that this invention is not limited to the details of construction and the arrangement of the parts illustrated on the accompanying drawing since the invention is capable of other embodiments. Also, it is to be understood that the phraseology or terminology herein contained is for the purpose of description and not limitation.

DETAILED DESCRIPTION OF DRAWING

FIG. 1, reference letter "A", represents the retort in which the reducing cycle takes place. Retort "A" possesses a shaft 10 which is divided preferably into two parts—the preheating zone 11, and the heating zone 12. Surrounding heating zone 12 is a plurality of induction coils 13, and on top of shaft 10, distribution hopper 14 is situated. Above hopper 14, crown 15 is preferably flanged mounted for maintenance purposes to distribution hopper 14. Charging pipe 17 is installed in crown 15 and is connected to material handling system 22, and is equipped with double valve arrangement for charging material without causing pollution as for example the use of valves 56 and 57. Within distribution hopper 14 rotating paddle means 54 attached to rod 61 are disposed to insure that material is fed into shaft 10 uniformly. Drive means 55 imparts the rotary motion to rod 61. Paddle means 54 is made up of two blades 103 and 104 which blades revolve in opposite direction to crush and shear any material that tends to bloat during pre-heating. Material handling system 22 supplies materials, preferably in a premixed form, for the reduction operation. Beneath heating zone 12, supporting bed 23 is situated which serves to support the entire charge contained in shaft 10. To one side of supporting bed 23, ejecting means 24 is disposed and to the other side of bed 23, discharge chute 25 is located beneath which vessel 26 is situated. Discharge chute 25 is equipped to deliver the metallized iron in a sealed fashion, as for example by the employment of a double valve arrangement such as valves 105 and 106. Discharge chute 25 is also equipped with a solid-gas separating arrangement 107 to separate the directly reduced iron from the gas which after separation, the gas is directed for use as a fuel but prior to such use the gas may be directed to desulfurizing means 108 via duct 109, and also the gas may be cooled with the heat energy recovered therefrom or used hot in a combustion chamber for power generation.

Vessel 26, preferably simulates a molten iron mixer and is adapted to revolve on rockers 27. At the bottom of mixer 26, induction coil 28 is preferably mounted between rockers 27. Also mixer 26 possesses an entry aperture 31 for receiving the metallized iron, a tap hole 32 for pouring the molten iron and a slagging spout 33 disposed opposite tap hole 31 for removing the ash, guangue and slag. Transfer car 29, equipped with hot-metal ladle 30, is disposed in such a way as to be within the pouring reach of mixer 26 in order to receive molten iron from it through tap hole 32. A second transfer 34, equipped with slag pot means 35, is suitably disposed for receiving slag from mixer 26 through spout 33. Fluxes are stored in hopper 36 and are added into mixer 26 through discharge pipe 49 which is situated above chute 25. Preferably, transfers 29 and 34 run on track 37 for movement towards and away-from mixer 26. Envelope 38 encloses part of chute 25, mixer 26, transfers 29 and 34, and track 37 in order to provide a fully enclosed system to control emissions and collect the gases. Envelope 38 is tied to a dust collection system (not shown) such as a bag house or precipitator, and is equipped with gates 78 for egress and ingress of transfers 29 and 34 out-of and into envelope 38. Mixer 38 may be equipped with other means of heating than induction coil 28 and also may be equipped with means to mix the metallized iron received from hopper 25 with molten iron contained in the mixer to speed up the melting of the directly reduced iron. Instead of melting the directly reduced iron ore after metallization, it may be used in the form of a sponge iron, provided the gangue and sulfur content are low enough to be useable as a charge material in the electric arc furnace, this would of course require the use of low sulfur coal and high grade ore with little silica.

Detailed Description of Retort "A"

Retort "A" is made up of the following components; (i) Crown 15; (ii) Distribution hopper 14; (iii) Shaft 10; (iv) Induction coils 13; (v) Supporting bed 23; (vi) Ejection means 24, and (vii) Delivery chute 25.

Crown 15—Crown 15 forms the top of retort "A". Material handling system 22 delivers the pre-mixed charge into retort "A" through crown 15; delivery pipe 17 which is part of system 22, is equipped with double closure valves 56 and 57, to prevent gases escaping from crown 15 during charging. Crown 15 is operated under a positive pressure to force the gases of volatilization to be directed downwardly. Crown 15 is preferably lined with refractory to minimize losses and to maintain the temperature of the raw gas above the condensation point of the tars to prevent their deposit within crown 15. Crown 15 may also be equipped with auxilliary heating means to insure that the gas within the crown stays hot to prevent tar condensation. Crown 15 is adapted for removal for maintenance, as for example crown 15 may be mounted on a transfer car and removed laterally or pivotally mounted by means of pivot 105 in order to rotate on an arcuate path to thereby provide access clearance to the top of shaft 10.

Distribution Hopper 14—Distribution hopper 14 is located beneath crown 14 and is equipped with distributing blades 103 and 104 which are adapted to rotate in opposite direction about rod 61, whilst drive 55 is provided as activating means. Drive 55 is located exteriorly of crown 15. Distribution hopper 14 is also lined to prevent heat losses. Both crown 15 and distribution hopper 15 may be heated by induction or otherwise to prevent tar deposits.

Shaft 10—Shaft 10 which is divided into pre-heating zone 11 and heating zone 12 is internally made up of a plurality of compartments such as compartment 45 and preferably these compartments are round in shape and extending the total height of shaft 10. Each compartment 45 is insulated by means of insulation 47 from its adjacent compartment so that heat can flow only into the space transcribed by walls 46 of each compartment which space is occupied by the charge and so that the magnetic flux induced to the walls of each compartment cannot flow to the walls of the adjacent compartment. The plurality of compartments 45 form a cluster of independently heated cavities with no contact between them whilst the heat radiating uniformly inwardly in each cavity to result in efficient and uniform heating irrespective of the diameter of the entire cluster. Even if the diameter of the cluster is 35 feet and each compartment or cavity 45 is 2 feet in diameter, each compartment will heat uniformly. This arrangement makes possible the construction of large units to make the instant invention competitive. Walls 46 of compartment 45 are preferably made of heat and abrasion-resistant steel or an alloy of iron and are heated by induction; in this manner efficient, uniform and controlled heating throughout shaft 10 is guaranteed. To prevent bridging of material within each compartment, walls 46 are preferably made to diverge downwardly. Compartments 45 are tied together to form a unitized structure with maximum heated surface area and with provisions for expansion vertically upwardly. A refractory material 48 is disposed outside the entire shaft to serve as an insulating envelope to minimize heat losses from the outside periphery of the cluster of compartments.

Induction Coils 13—Heating zone 12 of shaft 10 may comprise about two-thirds to three-fourths of shaft 10. Surrounding heating zone 12, a plurality of induction coils 13 are disposed in such a way as to provide controlled heating by induction of walls 46 of compartments 45. Walls 46 are uniformly heated and each area encompassed by each coil 13 is selectively controlled to a specific energy input to give the maximum efficiency in driving the volatiles from the coal and in making possible the reactions with the oxygen contained in the ore to provide a very efficient and controllable method of metallizing the ore to iron without fusion or melting. By pressurizing the retort and forcing the gases from the volatilization of the coal the reducing reactions are enhanced to still further make the method even more efficient. The rated energy delivered to walls 46 of each compartment 45 by means of coils 13 is such that metallization of the ore generally begins at the walls at the top of heating zone 12 and proceeds downwardly in such a manner as to substantially metallize the iron ore to ninety to ninety-three percent (90%–93%) by the time the charge material reaches the bottom of compartments 45. At the bottom of compartments 45, bulkheads 62 which are water cooled, are provided to support compartments 45. As the degree of metallization increases downwardly in shaft 10, a secondary effect of direct induction into the charge takes place. This phenomena adds to the efficiency of metallization, reduces power requirement and and accelerates cycle time.

Support Bed 23—Beneath compartments 45 support bed 23 is located. Bed 23 supports the total weight of the charge contained in shaft 10. This charge may weigh in excess of 1000 tons. Bed 23 is water-cooled.

Ejection Means 24—In order to remove the metallized material from the bottom of shaft 10, ejection means 24 is provided. It comprises ram 67 mounted on track wheels 68 with a gear rack 69 disposed to it. Rack 69 engages pinion gear 70 which is driven by any one of conventional drive-means (not shown). Track wheels 68 are guided by rails 72 in order to keep ram 67 in alignment while ejecting metallized material from the bottom of shaft 10. Head 73 of ram 67 is equipped with a frontal blade for pushing purposes. The pushing of ram 67 towards bulkheads 62 causes a shearing action to the metallized material below compartments 45, which action severs or slices the material from the rest of the material contained above bulkheads 62. The material leaves shaft 10 through opening 111. The gases that are generated from volatilization of the coal and the gases generated from the oxidation of the fixed carbon of the coal, which are directed downwardly and made to react with the oxygen of the ore, leave shaft 10 from opening 111 also. Ejection means 24 is fully sealed by means of enclosure 112 to prevent the escape of gases.

Delivery Chute 25—Delivery chute 25, which receives the hot reduced material from shaft 10 is made up of baffle means 107 and discharge arrangement 113. Baffle means 107 separates the solids from the gas and the solids are fed in a controlled manner from discharge arrangement 113 by means of valves 105 and 106. Baffle means 107 are also used to slow the gases down to acceptable velocities. If the directly reduced material is not to be melted, the material is fed between valve 105 and 106 and cooled by an inert gas which gas is then passed through a waste heat boiler and its heat energy recovered (not shown). If the directly reduced material is to be melted, it is fed into mixer 26 for liquification, de-sulfurization, deganguing and de-slagging. The gases resulting from the volatilization of the coal and the gases generated by the reaction of the fixed carbon in the coal which are jointly forced to flow downwardly by the internal pressure within compartments 45, may be removed from shaft 10 after their reaction with the oxygen of the iron ore, by re-directing them upwardly for removal from shaft 10 instead of the gases being removed through opening 111.

Operation

While the operation of the apparatus of the present invention may be comprehended from a study of the foregoing description, it is believed that the operation of this apparatus and the method itself should be explained, as hereinafter set forth.

Assuming that the apparatus has been initiated and the process is already operating, an appropriate charge of selected grades of coal and ore, and preferably cheap coal, are thoroughly mixed outside retort "A". Limestone or dolomite may be added to the coal and ore. They are next delivered to the top of retort "A" by material handling system 22, and they are charged into the top of retort "A" through pipe 7. The control of the charge material into the retort is effected by valves 56 and 57 to create a smokeless charging system. The charge material leaving pipe 17 drops through crown 15 and into distribution hopper 14. Paddle means 54, which are in constant rotation, distribute the charge material into the top of compartments 45. The level of material in distribution hopper 14 is maintained at such an elevation as to guarantee the continuous supply of material into compartments 45. In the event that the coal bloats blades 103 and 104 which revolve opposite to each other crush the bloated coal. The initial heating of the material takes place in pre-heating zone 11 to drive the moisture from the charge material and also initiate some reduction. The charge materials contained in compartments 45 keep descending while metallized material is ejected from the bottom of shaft 10, and upon entering heating zone 12, the charge material is effectively heated by the steel or iron walls 46 of compartments 45.

The volatilized gases leaving the coal are forced downwardly by the maintenance of pressure within shaft 10. Initially, that material which is contiguous to walls 46 is heated first because of contact with the red-hot walls 46 which possess a temperature of about 1,700° F. The coal, upon being heated at walls 46, gives up volatiles in the form of complex gases containing mainly $H_2$, $CH_4$, CO, $CO_2$, $H_2O$ and $N_2$ with about 75 percent of the gases made-up of $H_2$ and $CH_4$. Both CO and $H_2$ react with the oxygen of the ore to reduce that ore which is also hot because of its being contiguous to the red-hot walls 46. To enhance the reaction, it is preferred to operate retort "A" with a positive pressure and push the gases downwardly.

Since the charge, made up of coal and ore and possibly stone, is not a good conductor of heat, and since the reactions in retort 10 in totality are endothermic, the heat supplied by walls 46 which are in turn heated by coils 13, make up the difference of the energy to complete the reaction. From an energy efficiency standpoint, retort "A" is of the highest degree. This is so, because of the heat that is confined in each compartment 45 and directed to the space within each compartment 45, because of the exothermic reaction from the oxidation of the hydrogen and the carbon resulting in the generation of additional heat, and because of the direct induction heating taking place through the charge material once it metallizes. Further, the gases of volatilization being pushed downwardly enhance the reducing reaction. Since the walls of compartments 45 are around 1,700° F. methane which comprises about 32 percent of the gases of volatilization breaks up into $h_2$ and C; these two reductants added to the $H_2$ which comprises about 43 percent of the gases of volatilization, the reducing reactions become further enhanced. An excess of coal is purposely charged into retort "A" to guarantee the availability of carbon to make the reactions possible and keep the atmosphere within shaft 10 reductive. The gases which are released are complex and are made up mainly of hydrogen, compounds of hydrogen and compounds of carbon. The fixed carbon in the coal reacts with the $O_2$ to form CO which reacts with $O_2$ of the ore to form $CO_2$. During the forcing of the gases of volatilization downwardly, the tars, phenols, and oils are incinerated by passing through the hot zone of shaft 10 which temperature is about 1,700° F. This incineration takes away still more oxygen from the ore. The hot gases leaving shaft 10 via opening 111 is high in velocity but the gases are slowed down and the solids are separated from the gas by any one of known methods as for example baffle means 107. By virtue of the ejection of metallized material being cyclical, the gases leaving shaft 10 tend to pulsate because when ram 67 is in the retracted position, gases leave shaft 10 via opening 111, and when ram 67 is in the advanced position, the flow of the gases from opening 111 is restricted. Such pulsations of the gases in compartments 45, then to prevent bridging of material within compartments 45. The downward pressure of the gas also prevents bridging. The hot gases under pressure are employed usefully in the removal of sulfur therefrom, in releasing its sensible heat to a waste heat boiler and specifically in the burning of such gases in a combustion chamber that is tied to a gas turbine for combined cycle power generation (not shown but known in the art) and use the power generated for furnishing power to induction coils 13 and 28.

By way of example, the holding capacity of retort "A" for one million tons of production per year is about 1,400 tons of charge materials. For such productivity, the unit needs to be about 40 feet in diameter. To heat material uniformly in a retort of such diameter heretofore has not been practical. With the instant invention, this is made possible.

The metallized material is ejected from the bottom of shaft 10 my means of ram 67 while the material is hot, preferably about 1,600° F., and it is severed or sliced from the balance of the material located on compartments 45. The material is fed directly into mixer 26 or cooled and shipped as a sponge iron. The capacity of mixer 26 is around 600 tons; therefore, metallized material is fed into a large pool of molten iron which is super-heated to about 2,600° F. This super-heat, which is preferably generated by induction coil 28 which is situated at the bottom of mixer 26, liquifies the metallized metal same as an ice cube being dropped into a pitcher of piping hot tea; the ice cube melts rapidly in the tea. A stirring action is also induced by coil 28 to give an effective mixing action. An alternate method of melting such as plasma, may be used; also a mechanical mixing apparatus may be added to speed up the mixing.

In addition to the melting of the hot metallized material discharged into mixer 26, fluxes are added from hopper 36 to desulfurize the iron. Periodically, such as once per hour, molten iron is tapped from mixer 26 into ladle 30 through tap hole 32 with a minimum discharge of gangue, ash, or slag into ladle 30. The de-slagging and de-ganguing is accomplished by rotating mixer 26 in the opposite direction of the tap to remove the slag through spout 33. In following this procedure high quality iron, fully-desulfurized and having a uniform temperature and analysis, is delivered to the steel making furnace (not shown). With this kind of hot metal delivery, the maximum efficiency of the steelmaking furnace will be realized. It is to be noted that the metallized iron ejected from retort "A" preferably contains about 4.5 to 5 percent carbon in order to be comparable to molten iron from a blast furnace; such carbon content makes possible the use of oxygen in the electric furnace which in turn will contribute to an appreciable reduction in electric power consumption.

The location of retort "A" in relation to the steelmaking furnaces is of great importance. If the location of this facility is distant from the steelmaking furnaces, it is conceivable to use a submarine ladle instead of an open ladle, which open ladle is shown in the drawing.

If the steelmaking furnace is so remote from retort "A" as to make impractical the delivery of molten iron, it is then solidified into pigs of manageable size and are charged cold into said furnace. Generally, this will be the case in using cold pigs in conjunction with the electric furnace. With the selection of low silica ores and low sulfur coal, sponge iron may be made in retort "A" for use in the electric furnace also.

Since iron ore is a good sulfur remover, the gases leaving the retort are desulfurized in a very effective manner. The gases while hot may be further desulfurized in desulfurizer 108 after leaving retort "A". By desulfurizing in retort "A" and by removing the sulfur with fluxes such as with lime, magnesium, and soda in the mixer after the melt down of the metallized material, the use of high sulfur coals can substitute the expensive metallurgical coking coals now in use. Instead of the gases being removed from the bottom, retort "A" may be provided with an internal stack which is made to be adapted to re-direct the gases after their being forced downwardly, in the upward direction and leave the retort from the top or side thereof. Also instead of providing only one baffle 107 to separate the solids from the gases, a series of baffles may be added to increase the efficiency of separation.

Other advantages of directing the gases of volatilization downwardly are: The reactions of reduction will be enhanced which would result in faster reduction of the ore, in reduction in electrical power consumption and in reduction in coal usage. Of course instead of coal, other carbonaceous materials such as wood may be used as a reductant. Also to speed up the reactions of reduction, a catalyst may be used, such a catalyst usage may take the form of soaking the ore or coal in hydrochloric acid prior to charging.

Retort "A" is providing with the facility for the removal of crown 14, in order to make possible the maintenance of the top of retort "A", distribution means 54 and compartments 45. The removal of crown 14 can be effected by revolving it on an arcuate path such as about pivot 105 or by providing a transfer car running on rails with jacks to hoist crown 14 and move it sideways. Such removal will make possible the lifting of compartments 45 from shaft 10 by crane as for example by means of hook 110 engaging the top of compartment 45. This arrangement will make retort "A" easier to maintain.

It is to be noted that the efficiency of the reaction of the $H_2$ in the gases of volatilization with the $O_2$ of the ore is dependent upon the moisture content of the coal and the ore, therefore to get maximum advantage from forcing the gases downwardly it is preferred to have the coal and ore relatively dry.

Also to insure that no overheating of walls 46 of any compartment takes place it is important to maintain the flow through compartments 45 uniform in order to provide charge material at all times to take away the heat induced in walls 46 by induction heating coils 13. Controls are provided to coils 13 to modulate the power input into coils 13 in the event of overheating of a specific compartment. It is therefore also important to uniformly take away material from the bottom of compartments 45, so no material remains static for too long a period of time within compartments 45. Ejection means 24 is so designed to slice or push fairly uniform amounts from the bottom of each compartment 45, and distribution means 54 guarantees that material is fed into each and every compartment 45 at the top. In this manner the heat energy induced in walls 46 is constantly and uniformly taken away by the charge.

From the foregoing detailed description of the disclosure, it is evident that the instant invention is an important improvement to the disclosure of the said co-pending application referred to herein before, and all in all, it is submitted that the present invention provides a new and useful method and apparatus for the direct reduction of iron oxide, and for the significant generation of useful gas.

I claim:

1. A method of reducing iron oxide comprising the steps of:
   (a) charging iron oxide and a solid carbonaceous material into the inlet end of a plurality of compartments whose walls comprise a material which is adaptable to being heated by induction and wherein said plurality of compartments commonly shares an induction coil means which surrounds said plurality of compartments and said induction coil means does not individually surround any of said compartments;
   (b) heating said walls of said compartments by said induction coil means and transferring heat from said walls to the material contained therein by conduction to cause the metallization of the iron oxide by the reducing agents contained in the solid carbonaceous material;
   (c) discharging metallized iron from an outlet end of said plurality of compartments;
   (d) forcing the gaseous products generated by the reaction of the iron oxide and the reducing agents of the carbonaceous material, to flow toward the outlet end of said compartments to increase the efficiency of metallization; and
   (e) collecting said gaseous products resulting from said metallization.

2. The method as set forth in claim 1 wherein said step of heating said walls of said compartments by said induction coil means is further characterized by the step of isolating each compartment of said plurality of compartments in such a way as to have each compartment separated from its adjacent compartment.

3. The method as set forth in claim 2 wherein said step of isolating each compartment of said plurality of compartments is further characterized by the step of thermally insulating each compartment in such a way as to have the loss of heat from each compartment reduced to a minimum in order to efficiently drive the heat from the walls of each compartment to the charge contained within each compartment.

4. The method as set forth in claim 2 wherein said step of isolating each compartment of said plurality of compartments is further characterized by the step of electrically insulating each compartment in such a way as to have the short-circuiting of the magnetic flux from one compartment to an adjacent compartment reduced to a minimum in order to uniformly heat the walls of said compartments.

5. The method as set forth in claim 1 wherein said step of charging iron oxide and solid carbonaceous material into said plurality of compartments is further characterized by the step of distributing the iron oxide and the carbonaceous material charged into said plurality of compartments in such a way as to have substantially the same amount of iron oxide and solid carbonaceous material delivered to each compartment of said plurality of compartments.

6. The method as set forth in claim 5 wherein said step of distributing the iron oxide and solid carbonaceous material charged into said plurality of compartments in such a way as to have substantially the same amount of iron oxide and solid carbonaceous material delivered to each compartment is further characterized by the step of adding a fluxing agent to the charge and dispersing the flux agent within said charge.

7. The method as set forth in claim 1 wherein said step of discharging metallized iron from said plurality of compartments is further characterized by the step of melting the discharged metallized iron to produce an iron which is suitable for charging into a steel making furnace.

8. The method as set forth in claim 1 wherein the step of collecting the gaseous products resulting from said metallization is further characterized by the step of employing at least some of said gaseous products for drying and preheating the charge.

9. The method as set forth in claim 1 wherein the step of collecting the gaseous products resulting from said metallization is further characterized by cleaning said gaseous products.

10. The method as set forth in claim 1 being carried out in a controlled environment to prevent pollution to the atmosphere.

11. The method as set forth in claim 1 further characterized by the step of subjecting the charge to a positive pressure.

12. The method as set forth in claim 1 wherein said plurality of compartments extend generally vertically and wherein the step of heating said walls of said compartments by said induction coil means is further characterized by the step of heating said compartments in the vertical direction in zones to result in an efficient and controllable mode of heating.

13. The method as set forth in claim 1 wherein the step of discharging metallized iron from said plurality of compartments is further characterized by directing the hot metallized iron with the gangue and ash contained therein, into a mixing vessel and heating the discharged metallized iron, gangue and ash so as to melt the discharged metallized iron, gangue and ash in order to place these materials in condition for efficient desulfurization.

14. The method as set forth in claim 1 wherein the step of discharging metallized iron from said plurality of compartments is further characterized by the step of charging such metallized iron into a steelmaking furnace.

15. The method as set forth in claim 1 wherein the step of discharging metallized iron from said plurality of compartments is further characterized by the step of removing controlled amounts of metallized iron from said plurality of compartments.

* * * * *